United States Patent
Grass et al.

(10) Patent No.: US 9,991,571 B2
(45) Date of Patent: Jun. 5, 2018

(54) BATTERY MODULE WITH FLANGES IN FLUIDIC COMMUNICATION

(71) Applicant: Dr. Ing. h.c. F. Porsche Aktiengesellschaft, Stuttgart (DE)

(72) Inventors: Dominik Grass, Bietigheim-Bissingen (DE); Tim Schmidt, Ludwigsburg (DE); Thierry Mingers, Sospel (FR)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 377 days.

(21) Appl. No.: 14/834,977

(22) Filed: Aug. 25, 2015

(65) Prior Publication Data
US 2016/0064784 A1    Mar. 3, 2016

(30) Foreign Application Priority Data
Sep. 2, 2014   (DE) .................. 10 2014 112 624

(51) Int. Cl.
*H01M 2/12* (2006.01)
*H01M 10/625* (2014.01)
*H01M 2/10* (2006.01)
*H01M 10/6556* (2014.01)
*H01M 10/613* (2014.01)

(52) U.S. Cl.
CPC ....... *H01M 10/625* (2015.04); *H01M 2/1077* (2013.01); *H01M 10/613* (2015.04); *H01M 10/6556* (2015.04); *H01M 2220/20* (2013.01)

(58) Field of Classification Search
CPC ............. H01M 10/625; H01M 10/613; H01M 10/6556; H01M 2/1077; H01M 2220/30
See application file for complete search history.

(56) References Cited

U.S. PATENT DOCUMENTS

| 6,864,013 B2 * | 3/2005 | Gow | ................ H01M 2/0242 429/120 |
| 2002/0012833 A1 * | 1/2002 | Gow | ................ H01M 2/0242 429/120 |

(Continued)

FOREIGN PATENT DOCUMENTS

| DE | 10 2006 018 849 | 4/2007 |
| DE | 10 2008 014 155 | 9/2009 |

OTHER PUBLICATIONS

German Search Report dated May 4, 2015.

*Primary Examiner* — Raymond Alejandro
(74) *Attorney, Agent, or Firm* — Gerald E. Hespos; Michael J. Porco; Matthew T. Hespos

(57) ABSTRACT

A battery module (10) has a first and second partial modules (12, 16) with first and second battery cells (14, 18) respectively. A cooling medium for cooling the first battery cells (14) is in a first volume that is bounded by a first partial housing (28) and can flow through the first partial module (12), and a cooling medium for cooling the second battery cells (18) in a second volume bounded by a second partial housing (34) can flow through the second partial module (16). The first partial housing (28) has a first tubular flange (36) projecting into a first intermediate space (24) between the first battery cells (14), and the second partial housing (34) has a second tubular flange (38) projecting into a second intermediate space (30) between the second battery cells (18). The first and second volumes are connected via the first and second tubular flanges (36, 38).

9 Claims, 3 Drawing Sheets

(56) References Cited

U.S. PATENT DOCUMENTS

2005/0170239 A1    8/2005   Uemoto et al.
2011/0033742 A1    2/2011   Maier et al.
2014/0342211 A1*   11/2014   Choi .................. H01M 2/1077
                                                     429/120

* cited by examiner

BATTERY MODULE WITH FLANGES IN FLUIDIC COMMUNICATION

CROSS REFERENCE TO RELATED APPLICATION

This application claims priority under 35 USC 119 to German Patent Appl. No. 10 2014 112 624.6 filed on Sep. 2, 2014, the entire disclosure of which is incorporated herein by reference.

BACKGROUND

1. Field of the Invention

The invention relates to a battery module for providing purely electric drive of a motor vehicle, by means of which battery module sufficient electrical energy can be stored to be able to drive a motor vehicle.

2. Description of the Related Art

DE 10 2006 018 849 A1 discloses a battery module in which plural round battery cells are arranged coaxially one behind the other to form a row of cells that are connected in series. Plural rows of battery cells are arranged next to one another, transversely with respect to the longitudinal extent of the battery cells. Rows of battery cells that follow in the column direction, but are offset by half the distance of the center line in the row direction of following battery cells. The battery cells are inserted in rows into a multi-part module frame. The module frame has a basically rectangular outer shape in a plane running transverse to the longitudinal direction of the battery cells. An essentially semi-round depression extends over the entire length of the module frame in the longitudinal direction of the battery cells that are arranged one behind the other, and projects into an intermediate space between the battery cells arranged offset with respect to one another, at the line end of the battery cells.

There is a continuous need to reduce the installation space of battery modules and to increase their level of efficiency.

The object of the invention is to provide a battery module with a small installation space and a high level of efficiency.

SUMMARY

A battery module for providing purely electric drive of a motor vehicle has first and second partial modules. The first partial module has a first partial housing with plural first battery cells that may be round cells. A cooling medium for cooling the first battery cells can flow through a first volume that is bounded at least partially by the first partial housing. The second partial module a second partial housing with plural second battery cells that may be round cells. A cooling medium for cooling the second battery cells can flow through a second volume that is bounded at least partially by the second partial housing. A side of the first partial housing pointing toward the second partial housing has a first tubular flange projecting into a first intermediate space formed between the first battery cells, and a side of the second partial housing pointing toward the first partial housing has a second tubular flange projecting into a second intermediate space formed between the second battery cells. The first volume is connected to the second volume via the first and second tubular flanges.

The partial housings enable the respective partial modules to be bound in a fluid-tight volume in which the battery cells are arranged, and the electric connections of the battery cells can be led out of this volume. As a result, the cooling medium can flow around the battery cells to achieve a high degree of cooling of the battery cells and to permit a particularly efficient operation of the battery cells. At the same time, an electric short-circuit via the cooling medium can be avoided. In particular, the cooling medium can directly contact the battery cells so that there is no need for intermediately connected, heat-conducting components to bring about an exchange of heat between the battery cells and the cooling medium. As a result, the cooling power is high, and the level of efficiency of the battery cells and the battery module are increased.

The first battery cells and the second battery cells are arranged one behind the other so that they cover one another in the longitudinal direction. Additionally, the first and second intermediate spaces are arranged one behind the other so that they cover one another. As a result, the first and second tubular flanges can be arranged one behind the other and may make contact with one another over a surface. The first tubular flange can have a first through-opening, and the second tubular flange can have a second through-opening arranged coaxially with the first through-openings. The through-openings of the tubular flanges can form a straight collector pipe that can project into each of the intermediate spaces of the volumes formed in the partial modules. As a result, the cooling medium can flow from the first intermediate space of the first partial module into the second intermediate space of the second partial module. If the battery cells are round, the intermediate spaces for the cooling medium are produced automatically between the battery cells and/or between the battery cells and a module frame in which the partial modules are accommodated. The module frame can be formed at least partially of the partial housings. The fluidic connection between the first volume of the first partial module and the second volume of the second partial module is achieved in an essentially installation-space-neutral fashion in the intermediate spaces that are present in any case. As a result, no additional installation space is required for the fluidic connection formed by the tubular flanges of the first and second partial modules. The tubular flanges arranged in the intermediate spaces formed by the shaping and arrangement of the battery cells enables direct cooling of the first and second battery cells without requiring additional installation space. As a result, the battery module has a small installation space and a high level of efficiency.

The longitudinal extents of the respective battery cells can run essentially parallel to one another. The battery cells can be arranged one behind the other in two orthogonal directions with respect to one another, and perpendicular to the longitudinal extent of the battery cells. As a result, the battery cells can be arranged centrally with respect to one another in rows and columns so that a gusset-shaped intermediate region can be produced between two round battery cells and a sidewall of the partial housing. The cross-sectional area of the intermediate region is large enough parallel to the longitudinal extent of the battery cells to accommodate the tubular flanges. The number of tubular flanges and/or the size of the through-openings of the tubular flanges can form in sum a flow cross-section that can conduct a sufficiently large mass flow of the coolant from the first partial module to the second partial module. The battery cells can be arranged centrally in rows one behind the other. Battery cell rows that follow in the column direction can be offset with respect to one another by approximately one half a distance of the center lines of two battery cells that follow in the row direction. Thus an intermediate space in at least one row of battery cells between the last battery cell in the row direction and the module frame has an extent in the row direction of approximately one half a distance of the center lines of two battery cells that follow in the row direction. The cross-sectional area parallel to the longitudinal extent of the battery cells of this intermediate space is large enough to accommodate correspondingly large tubular flanges with a correspondingly large flow cross-section. As a result, a reversal collector pipe may be formed by the tubular flanges and may have a flow cross-section that can conduct a sufficiently large mass flow of the coolant from the first partial module to the second partial module.

The first partial module may have an inlet for feeding in the cooling medium, and the second partial module may have an outlet for discharging the cooling medium. The inlet may be a tubular flange projecting, on a side pointing away from the second partial housing into an intermediate space between the first battery cells, and the outlet also may be a tubular flange projecting on a side pointing away from the first partial housing into an intermediate space between the second battery cells. With this arrangement, only the first partial module has the inlet, and only the second partial module has the outlet. The inlet and the outlet are at an end of the partial modules lying opposite the tubular flange. As a result, the cooling medium that is fed in via the inlet first flows through the first partial module and subsequently through the second partial module via the tubular flanges that communicate with one another. As a result, all of the battery modules can be cooled with a high cooling power. The inlet and/or the outlet may be identically shaped tubular flanges. Thus, a plurality of first and second partial modules can be connected fluidically to one another in an alternating fashion. As a result, plural planes of battery cells can be cooled, and the cooling medium can flow through the respective planes of battery cells of the various partial modules in the form of a sinuous or meandering line.

The first partial housing may have a first attachment projection adjacent the first tubular flange and pointing away from the first volume for attachment to the second partial housing. Similarly, the second partial housing may have a second attachment projection adjacent the second tubular flange and pointing away from the second volume for attachment to the first partial housing. The attachment projection is easily accessible when mounting the battery module even if the partial modules are positioned one behind the other so that mounting is easy. The spatial proximity of the attachment projections to the tubular flange when the first and second attachment projections are connected, for example by a screw or rivet connection, enables a sufficiently high contact pressure force to be applied to the tubular flanges that point toward one another. The contact pressure force can achieve a liquid-tight abutment of the tubular flanges against one another. Direct attachment of the tubular flanges using attachment means surrounding the through-openings of the tubular flanges is not necessary. In particular, the tubular flanges can protrude slightly toward one another, so that the tubular flanges can be clamped with a clamping force that exceeds the contact pressure force of the attachment projections.

The first tubular flange may be connected to the second tubular flange in a fluid-tight fashion by a sealing element, such as an O-ring. As a result, sufficient tightness can be achieved between the tubular flanges so that the cooling medium cannot arrive at the poles of the first and second battery cells that point toward one another. An easily mountable O-ring achieves the necessary seal with respect to the cooling medium in an easy cost-effective manner.

The first battery cell may have a first pole projecting in a fluid-tight fashion from the first volume and pointing toward the second partial module, and the second battery cell may have a second pole projecting in a fluid-tight fashion from the second volume and pointing toward the first partial module. The first and/or second pole may be in an intermediate volume that is sealed with respect to the cooling medium. As a result, cooling medium cannot flow through the intermediate volume, thereby avoiding a short-circuit of the battery cells. At the same time, electrical contact can be formed between the first and second battery cells in an essentially installation-space-neutral fashion using electrical connecting elements in the intermediate volume. In addition, electrical contact can be formed between the first and/or second battery cells using electrical connecting elements in the intermediate volume.

The first and second tubular flange may form a reversal collector pipe that spans a distance between the first and second volumes. The distance between the first and second volumes can be conditioned by an intermediate volume that is sealed with respect to the cooling medium and has the purpose of arranging poles of the first and/or second battery cells. Thus, the tubular flanges can span a correspondingly large distance in the manner of a reversal collector pipe to connect the first volume to the second volume. As a result, the tubular flanges form a breakthrough between the partial modules and also form a pipeline.

The first volume may include a first collector volume above the first tubular flange in a direction pointing away from the second partial module for diverting the cooling medium into the first tubular flange. Similarly, the second volume may include a second collector volume below the second tubular flange in a direction pointing away from the first partial module for diverting the cooling medium from the second tubular flange. The tubular flanges do not extend over the entire length parallel to the longitudinal extent of the battery cells within the intermediate spaces. As a result, the coolant can flow through the collector volume and can be deflected into the tubular flange while remaining between the respective tubular flange and a cover that points away from the other partial module.

The second partial module may be symmetrical with respect to the first partial module. As a result, a correspondingly large number of identical parts can be used for the partial modules to achieve a cost effective manufacturing.

The first battery cells may be arranged in rows next to one another with the first tubular flanges arranged at the ends of each second row in the column direction on a first sidewall of the first partial housing. Similarly, the second battery cells may be arranged in rows next to one another at the ends of each second row in the column direction with the second tubular flanges arranged on a second sidewall of the second partial housing. The battery cells can be arranged centrally in rows one behind the other, and rows of battery cells that follow in the column direction can be offset with respect to one another by approximately half the distance between the center lines of two battery cells that follow in the row direction. Thus, in each second row of battery cells in the column direction, the intermediate space between the last battery cell in the row direction and the module frame, in which intermediate space in each case the tubular flange can project from the partial housing. The extent of the intermediate space in the row direction is approximately half the distance between the center lines of two battery cells which follow in the row direction.

The invention will be explained by way of example below with reference to the appended drawings and by means of preferred exemplary embodiments, wherein the features which are illustrated below can represent an aspect of the invention, either individually or else in combination.

DETAILED DESCRIPTION

Figure 1:
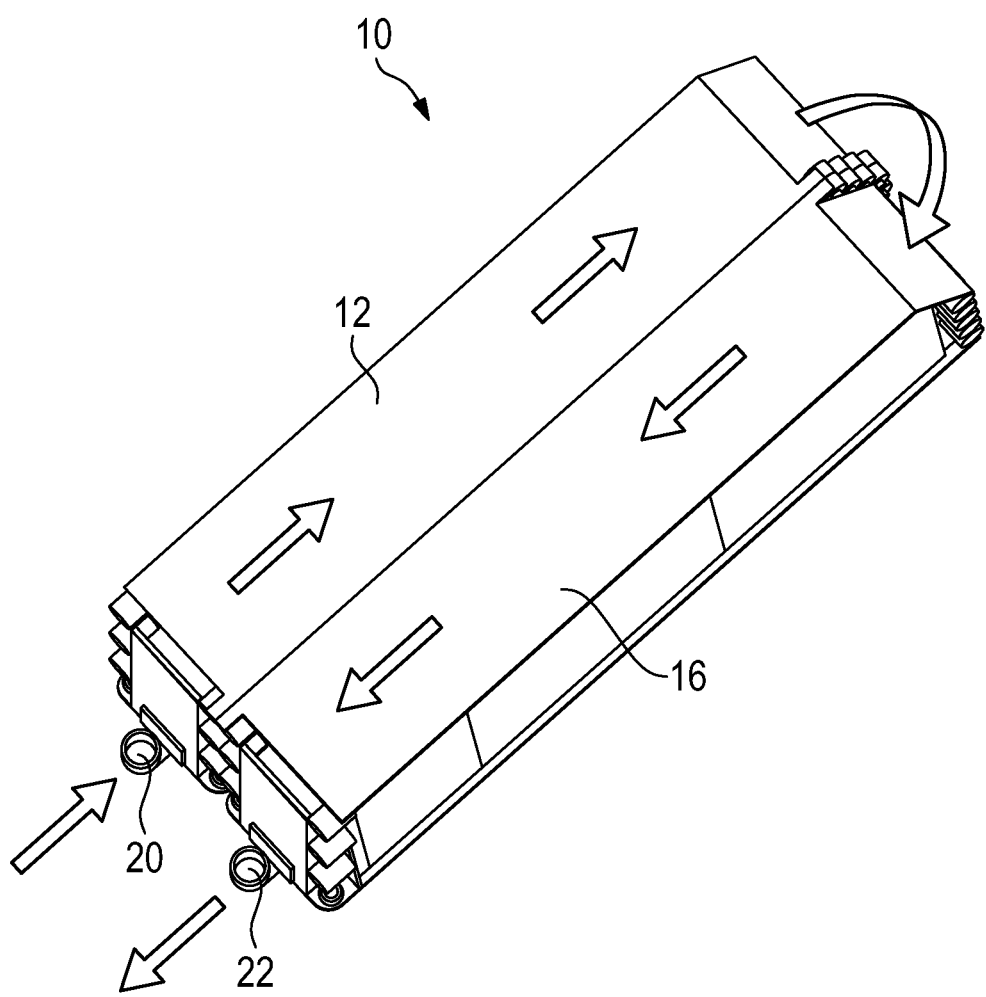
FIG. 1 is a schematic perspective view of a battery module.
Figure 2:
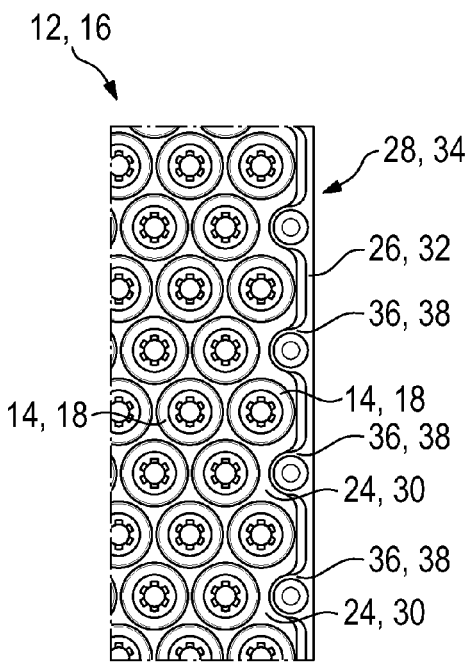
FIG. 2 is a schematic side view of a partial module of the battery module of FIG. 1 in a first sectional plane.
Figure 5:
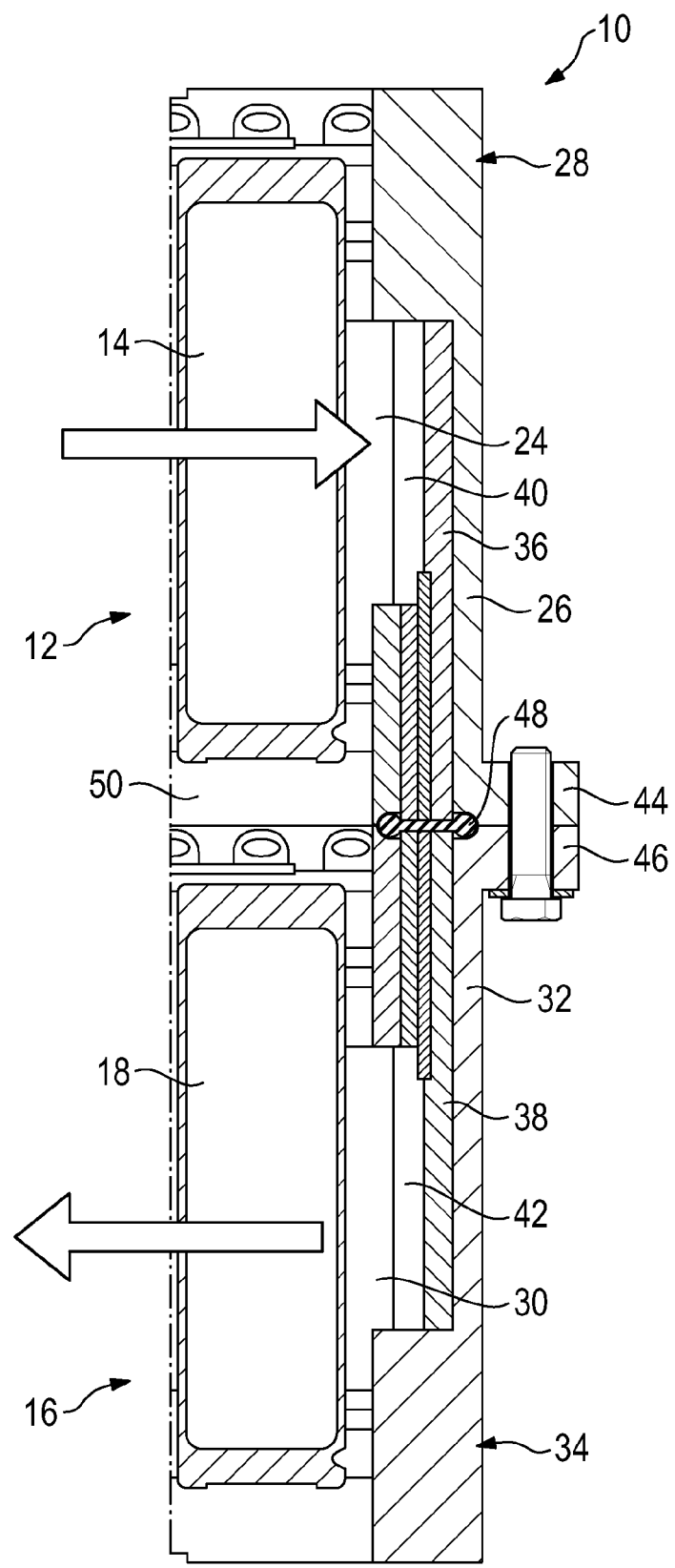
FIG. 5 shows a schematic sectional view through part of the battery module from FIG. 1.

A battery module in accordance with the invention is identified generally by the numeral 10 in FIGS. 1 and 5. The battery module 10 has a first partial module 12 with first battery cells 14 that are configured as round cells, and a second partial module 16 with second battery cells 18 that are configured as round cells, as shown in FIG. 2. The battery cells 14, 18 are oriented, for example, horizontally, and in each case a first battery cell 14 and a second battery cell 18 are coaxial with respect to one another. The first partial module 12 has an inlet 20 via which a cooling medium can be fed in, whereas the second partial module 16 has an outlet 22 for discharging the cooling medium.

As illustrated in FIG. 2, the battery cells 14, 18 are arranged one next to the other centrally in rows, with cells that follow in the column direction are offset by approximately half the distance between the center lines of the battery cells 14, 18. Thus, the installation space can be kept small in the column direction. As a result of this arrangement of the battery cells 14, 18, a first intermediate space 24 is produced between the first battery cells 14 and a first sidewall 26 of a first partial housing 28 in alternating rows, and a second intermediate space 30 is produced between the second battery cells 18 and a second sidewall 32 of a second partial housing 34. A first tubular flange 36 protrudes from the first sidewall 26 of the first partial housing 28 into the first intermediate space 24, while a second tubular flange 38 protrudes from the second sidewall 32 of the second partial housing 34 into the second intermediate space 30. Each first tubular flange 36 is connected in a fluid-tight fashion to the second tubular flange 38 lying opposite. As a result, a cooling medium that directly cools the first battery cells 14 can flow from the first partial module 12 via the tubular flanges 36, 38 into the second partial module 16 to cool there the second battery cells 18 directly.

Figure 3:
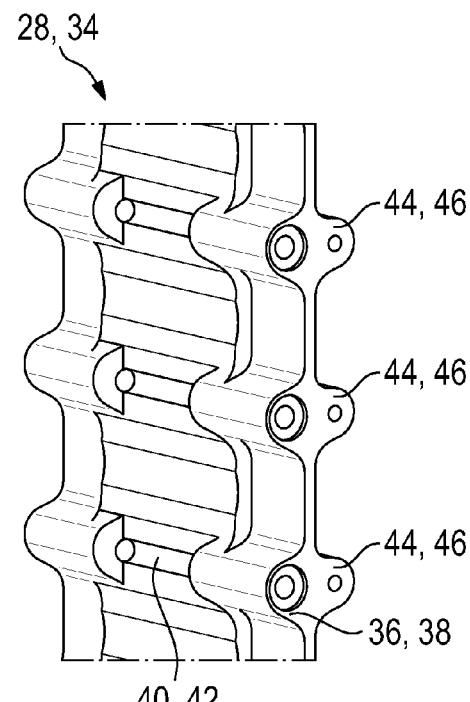
FIG. 3 is a schematic perspective view of a part of a partial housing of the partial module of FIG. 2.
Figure 4:
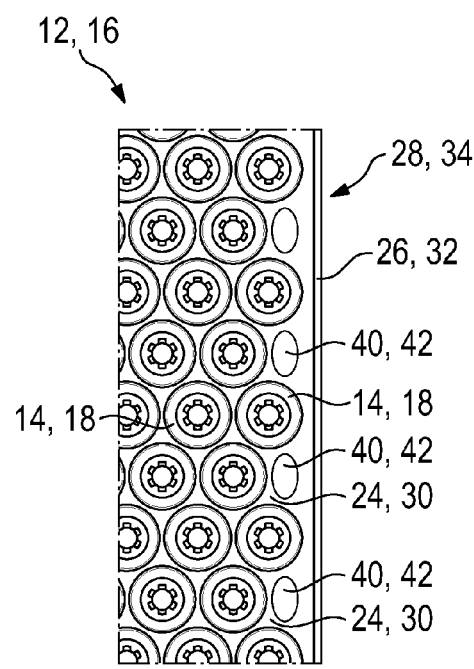
FIG. 4 is a schematic side view of a partial module of the battery module of FIG. 1 in a second sectional plane that is offset with respect to FIG. 2.

As illustrated in FIGS. 3 and 4, the tubular flanges 36, 38 project only somewhat in the intermediate spaces 24, 30 through which the cooling medium can flow. Thus, a first collector volume 40 remains inside the first intermediate space 24 above the first tubular flange 36, and a second collector volume 42 remains inside the second intermediate space 30 below the second tubular flange 38. Thus, the cooling medium can be deflected toward or away from the tubular flanges 36, 38. A first attachment projection 44 protrudes out from the first sidewall 28 opposite the first tubular flanges 36, while a second attachment projection 46 protrudes out from the second sidewall 32 opposite the second tubular flanges 38. The partial housings 28, 34 can be connected to one another by the attachment projections 44, 46 to form a common module frame, with the result that the first partial module 12 can also be connected to the second partial module 16.

As shown in FIG. 5, a sealing element 48, which is configured as an O-ring, can be provided between the first and second tubular flanges 36 and 38. The sealing element 48 permits a fluid-tight connection of the first tubular flange 36 to the second tubular flange when the attachment projections 44, 46 are fastened to one another. As a result, an intermediate volume 50 is formed and is sealed with respect to the cooling medium between the first battery cells 14 and the second battery cells 18, in which intermediate space poles of the first battery cells 14 and/or the second battery cells 18 can project in the intermediate volume 50 without the risk of ingressing coolant bringing about an electrical short-circuit.

What is claimed is:

1. A battery module for providing purely electric drive of a motor vehicle, the battery module comprising:
   a first partial module having a first partial housing with a first volume surrounded by at least one first sidewall, a plurality of first battery cells accommodated in the first volume, each of the plurality of first battery cells extending in an axial direction and parallel to each other, and a first intermediate space between the plurality of first battery cells and the at least one first side wall, and at least one first tubular flange protruding into the first intermediate space to accommodate a flow of a cooling medium from the at least one tubular flange and through the first partial module for cooling the plurality of first battery cells; and
   a second partial module connected to the first partial module, the second partial module having a second partial housing with a second volume surrounded by at least one second sidewall, a plurality of second battery cells accommodated in the second volume, each of the plurality of second battery cells arranged coaxially with one of the plurality of first battery cells, and a second intermediate space between the plurality of second of battery cells and the at least one second side wall, and at least one second tubular flange protruding into the second intermediate space, the at least one second tubular flange being in fluidic communication with the at least one first tubular flange to accommodate a flow of the cooling medium from the at least one first tubular flange to the at least one second tubular flange and into the second partial module for cooling the second battery cells.

2. The battery module of claim 1, wherein the first partial module has an inlet for feeding in the cooling medium, and the second partial module has an outlet for discharging the cooling medium, the inlet being a tubular inlet flange projecting on a side pointing away from the second partial housing into the first intermediate space formed between the plurality of first battery cells, and the outlet being a tubular outlet flange projecting, on a side pointing away from the first partial housing into the second intermediate space formed between the plurality of second battery cells.

3. The battery module of claim 2, wherein the first partial housing has a first attachment projection adjacent to the first tubular flange and pointing away from the first volume for attachment to the second partial housing and the second partial housing has a second attachment projection adjacent to the second tubular flange and pointing away from the second volume for attachment to the first partial housing.

4. The battery module of claim 3, further comprising a seal between the first tubular flange the second tubular flange for achieving a fluid-tight connection.

5. The battery module of claim 1, wherein each of the plurality of first battery cells has a first pole projecting from the first volume and pointing toward the second partial module, and the second battery cell has a second pole projecting from the second volume and pointing toward the first partial module, wherein the first and second poles are in an intermediate volume that is sealed with respect to the cooling medium.

6. The battery module of claim 1, wherein the first tubular flange and the second tubular flange form a reversal collector pipe that spans a distance between the first volume and second volume.

7. The battery module of claim 1, wherein the first volume forms a first collector volume in a direction pointing away from the second partial module for diverting the cooling medium into the first tubular flange, and the second volume forms a second collector volume in a direction pointing away from the first partial module for diverting the cooling medium from the second tubular flange.

8. The battery module of claim 1, wherein the second partial module is symmetrical with respect to the first partial module.

9. The battery module of claim 1, wherein the plurality of first battery cells are arranged in at least first and second rows next to one another and the at least one first tubular flange is arranged on the first sidewall of the first partial housing at ends of the second row, and the plurality of second battery cells are arranged in at least first and second rows next to one another and the at least one second tubular flange is arranged on the second sidewall of the second partial housing at ends of the second row.

* * * * *